US011224054B2

(12) United States Patent
Yeo et al.

(10) Patent No.: US 11,224,054 B2
(45) Date of Patent: Jan. 11, 2022

(54) TRANSMISSION METHOD AND APPARATUS FOR REDUCING LATENCY IN WIRELESS CELLULAR COMMUNICATION

(71) Applicant: Samsung Electronics Co., Ltd., Gyeonggi-do (KR)

(72) Inventors: Jeongho Yeo, Gyeonggi-do (KR); Jinyoung Oh, Seoul (KR); Heedon Gha, Gyeonggi-do (KR)

(73) Assignee: Samsung Electronics Co., Ltd

( * ) Notice: Subject to any disclaimer, the term of this patent is extended or adjusted under 35 U.S.C. 154(b) by 200 days.

(21) Appl. No.: 16/323,392

(22) PCT Filed: Aug. 11, 2017

(86) PCT No.: PCT/KR2017/008748
§ 371 (c)(1),
(2) Date: Feb. 5, 2019

(87) PCT Pub. No.: WO2018/030842
PCT Pub. Date: Feb. 15, 2018

(65) Prior Publication Data
US 2020/0389909 A1    Dec. 10, 2020

(30) Foreign Application Priority Data
Aug. 11, 2016    (KR) .................. 10-2016-0102560

(51) Int. Cl.
*H04W 4/00*    (2018.01)
*H04W 72/12*    (2009.01)
*H04W 56/00*    (2009.01)

(52) U.S. Cl.
CPC ... *H04W 72/1257* (2013.01); *H04W 56/0045* (2013.01); *H04W 72/1284* (2013.01); *H04W 72/1289* (2013.01)

(58) Field of Classification Search
USPC ................. 370/330, 329, 328, 331
See application file for complete search history.

(56) References Cited

U.S. PATENT DOCUMENTS

| 2013/0163537 A1 | 6/2013 | Anderson et al. |
| 2014/0036859 A1* | 2/2014 | Ekpenyong ....... H04W 72/1231 370/330 |

(Continued)

FOREIGN PATENT DOCUMENTS

| KR | 1020180007584 | 1/2018 |
| WO | WO 2015020478 | 2/2015 |

(Continued)

OTHER PUBLICATIONS

PCT/ISA/210 Search Report issued on PCT/KR2017/008748 (pp. 5).

(Continued)

*Primary Examiner* — David Q Nguyen
(74) *Attorney, Agent, or Firm* — The Farrell Law Firm, P.C.

(57) ABSTRACT

The present disclosure relates to a 5G or a pre-5G communication system for supporting higher data transmission rates in a beyond-4G communication system, such as LTE. Particularly, the present disclosure relates to a method for a base station in a wireless communication system, comprising the steps of: transmitting resource information of a scheduling request (SR) for each transmission type, to a terminal accessing the base station; and receiving an SR corresponding to the transmission type of the terminal from the terminal, in response to the transmission of the resource information of the SR.

12 Claims, 17 Drawing Sheets

(56) References Cited

U.S. PATENT DOCUMENTS

| | | |
|---|---|---|
| 2014/0269454 A1 | 9/2014 | Papasakellariou |
| 2015/0009815 A1 | 1/2015 | Hsu et al. |
| 2015/0049697 A1 | 2/2015 | Worrall et al. |
| 2015/0223141 A1* | 8/2015 | Chatterjee ............. H04L 5/0092 370/329 |
| 2015/0327180 A1* | 11/2015 | Ryu ..................... H04W 52/18 370/329 |
| 2015/0327263 A1* | 11/2015 | Chen ..................... H04W 16/14 370/280 |
| 2015/0373678 A1 | 12/2015 | Chou et al. |
| 2016/0234857 A1* | 8/2016 | Chen ..................... H04L 5/0091 |
| 2016/0295575 A1* | 10/2016 | Dinan .................. H04L 5/0057 |
| 2017/0064706 A1* | 3/2017 | Patel ................. H04W 28/0236 |
| 2017/0150499 A1* | 5/2017 | Kim ..................... H04L 5/0051 |
| 2017/0202009 A1 | 7/2017 | Kim et al. |
| 2018/0019838 A1 | 1/2018 | Yeo et al. |
| 2018/0020365 A1* | 1/2018 | Xiong .................. H04W 88/02 |
| 2018/0077719 A1* | 3/2018 | Nory ................. H04W 28/0278 |
| 2018/0227958 A1* | 8/2018 | Xiong ............... H04W 74/0833 |

FOREIGN PATENT DOCUMENTS

| | | | |
|---|---|---|---|
| WO | WO 2016010227 | 1/2016 | |
| WO | WO-2016010227 A1 * | 1/2016 | ........ H04W 72/0413 |
| WO | WO 2017196059 | 11/2017 | |

OTHER PUBLICATIONS

PCT/ISA/237 Written Opinion issued on PCT/KR2017/008748 (pp. 6).

European Search Report dated May 10, 2019 issued in counterpart application No. 17839859.0-1215, 7 pages.

Samsung, "Discussion on Processing Time for TTI Shortening", R1-164797, 3GPP TSG RAN WG1 Meeting #85, May 23-27, 2016, 5 pages.

LG Electronics, "Processing Time Reduction for Latency Reduction", R1-165429, 3GPP TSG RAN WG1 Meeting #85, May 23-27, 2016, 7 pages.

European Search Report dated Mar. 6, 2020 issued in counterpart application No. 19212585.4-1215, 7 pages.

\* cited by examiner

TRANSMISSION METHOD AND APPARATUS FOR REDUCING LATENCY IN WIRELESS CELLULAR COMMUNICATION

PRIORITY

This application is a National Phase Entry of PCT International Application No. PCT/KR2017/008748 which was filed on Aug. 11, 2017, and claims priority to Korean Patent Application No. 10-2016-0102560, which was filed on Aug. 11, 2016, the content of each of which is incorporated herein by reference.

TECHNICAL FIELD

The present disclosure relates to a wireless communication system and, more particularly, to a method and apparatus for reducing latency.

BACKGROUND ART

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, implementation of the 5G communication system at a super-high frequency (mmWave) band (e.g., such as a 60 GHz band) is being considered. In order to obviate a propagation loss of a radio wave and increase a delivery distance of a radio wave at the super-high frequency band, discussions are underway about various techniques such as a beamforming, a massive MIMO, a full dimensional MIMO (FD-MIMO), an array antenna, an analog beam-forming, and a large scale antenna for the 5G communication system.

Additionally, for an improvement in the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like.

Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

DISCLOSURE OF INVENTION

Technical Problem

In order to support a maximum distance of 100 km between a base station and a terminal in a wireless communication system, transmission should be made about 0.67 ms earlier than timing determined based on terminal reception. This is to match the reception timing of signals transmitted from a plurality of terminals at the base station, and this is referred to as timing advance.

In the conventional LTE system using a transmission time interval of 1 ms, the terminal receives an uplink scheduling grant from the base station and performs uplink data transmission (PUSCH transmission) after about 4 ms. Also, the terminal receives downlink data (PDSCH) from the base station and transmits as uplink control signal (PUCCH or PUSCH) an HARQ ACK or NACK for the downlink data (PDSCH) after about 4 ms.

Thus, conventionally, a processing time used for the terminal to process a received signal and prepare a signal to be transmitted is about a time excluding timing advance from 3 ms, and this may be about 2.33 ms minimally in consideration of the maximum timing advance. In the conventional LTE system, the maximum TA value assumed by the terminal is about 0.67 ms. When receiving a TA value greater than the maximum TA value from the base station, the terminal may perform again a process, such as cell selection, initial access, or RACH, before data transmission/reception.

In this case, if the transmission time interval (TTI) length is shorter or if there are several TTI lengths, a method of fixing the timing of transmitting uplink data after receiving uplink scheduling grant and the timing of transmitting HARQ ACK or NACK as uplink control channel after receiving downlink data may be inefficient or may cause the terminal to be incapable of transmission to the base station at a predetermined time according to the degree of TA.

Therefore, for the terminal that has a shorter TTI length or requires speeding up the timing of transmitting uplink data after receiving uplink scheduling grant and the timing of transmitting HARQ ACK or NACK as uplink control channel after receiving downlink data, it is possible to secure a processing time by lowering restrictions on the maximum TA value assumed by the terminal.

The present disclosure provides an operation method of a terminal when a TA value exceeding the new maximum TA value is received.

Solution to Problem

According to an embodiment of the present disclosure, a method of a base station in a wireless communication system may comprise transmitting, to a terminal accessing the base station, resource information of a scheduling request (SR) for each transmission type; and receiving, from the terminal, the SR corresponding to the transmission type of the terminal in response to transmission of the resource information of the SR.

In addition, according to an embodiment of the present disclosure, a base station in a wireless communication system may comprise a transceiver configured to transmit or receive a signal to or from a terminal; and a controller configured to control the transceiver to transmit resource information of a scheduling request (SR) for each transmission type to the terminal, and to control the transceiver to receive the SR corresponding to the transmission type of the terminal from the terminal in response to transmission of the resource information of the SR.

In addition, according to an embodiment of the present disclosure, a method of a terminal in a wireless communication system may comprise receiving, from a base station, resource information of a scheduling request (SR) for each transmission type; determining a transmission type of the terminal, based on at least one of data to be transmitted to the base station and a timing advance (TA) value of the terminal; and transmitting, to the base station, the SR corresponding to the determined transmission type in the resource information of the SR.

In addition, according to an embodiment of the present disclosure, a terminal in a wireless communication system may comprise a transceiver configured to transmit or receive a signal to or from a base station; and a controller configured to control the transceiver to receive resource information of a scheduling request (SR) for each transmission type from the base station, to determine a transmission type of the terminal, based on at least one of data to be transmitted to the base station and a timing advance (TA) value of the terminal, and to control the transceiver to transmit the SR corresponding to the determined transmission type in the resource information of the SR to the base station.

Advantageous Effects of Invention

As described above, the present disclosure provides an operation method capable of reducing a delay in transmission/reception between a terminal and a base station, thereby allowing the base station and the terminal to operate efficiently, reduce a transmission time delay, or reduce power consumption.

MODE FOR THE INVENTION

Outgrowing an initial voice-oriented service, wireless communication systems are evolving into wideband wireless communication systems for providing a high-speed, high-quality packet data service, based on various communication standards such as high speed packet access (HSPA), long term evolution (LTE), evolved universal terrestrial radio access (E-UTRA), or LTE-advanced (LTE-A) of 3GPP, high rate packet data (HRPD) or ultra mobile broadband (UMB) of 3GPP2, and 802.16e of IEEE. In addition, a 5G or new radio (NR) communication standard is being developed as the 5th generation wireless communication system.

The LTE system, which is an example of wideband wireless communication systems, adopts an orthogonal frequency division multiplexing (OFDM) scheme for downlink (DL) and also adopts a single carrier frequency division multiple access (SC-FDMA) scheme for uplink (UL). The uplink refers to a radio link in which a terminal (also referred to as user equipment (UE) or a mobile station (MS)) transmits data or control signals to a base station (also referred to as BS or eNode B). The downlink refers to a radio link in which the base station transmits data or control signals to the terminal. The above multiple access scheme distinguishes data or control information of respective users by allocating and operating time-frequency resources for transmitting the data or control information for each user so as not to be overlapped with each other, namely, so as to realize the orthogonality.

The LTE system adopts a hybrid automatic repeat request (HARQ) scheme in which, when a decoding failure occurs in the initial transmission, corresponding data is retransmitted on the physical layer. In the HARQ scheme, if the receiver fails to correctly decode data, the receiver transmits information (negative acknowledgment (NACK)) indicating a decoding failure to the transmitter so that the transmitter retransmits the corresponding data on the physical layer. The receiver combines the data retransmitted by the transmitter with the previously decoding-failed data, thereby improving data reception performance. In addition, when the receiver correctly decodes data, the receiver transmits information (acknowledgment (ACK)) indicating successful decoding to the transmitter so that the transmitter transmits new data.

Figure 1:
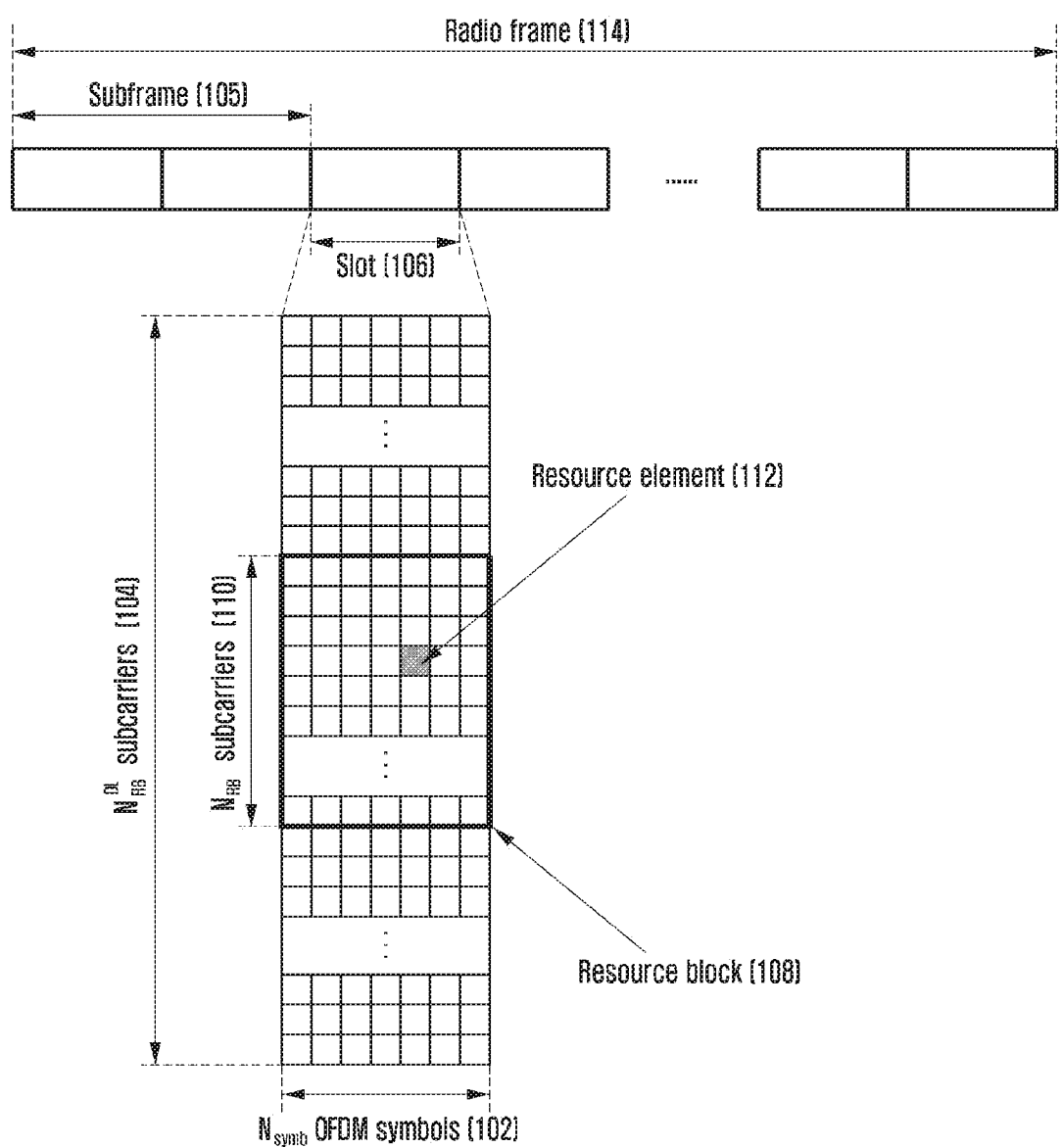
FIG. 1 is a diagram illustrating a downlink time-frequency domain transmission structure of a conventional LTE or LTE-A system.

FIG. 1 is a diagram illustrating a basic structure of a time-frequency domain which is a radio resource area for transmission of a data or control channel on downlink in the LTE system.

In FIG. 1, the horizontal axis represents the time domain, and the vertical axis represents the frequency domain. The minimum transmission unit in the time domain is an OFDM symbol. $N_{symb}$ OFDM symbols 102 constitute one slot 106, and two slots constitute one subframe 105. The length of the slot is 0.5 ms, and the length of the subframe is 1.0 ms. A radio frame 114 is a time domain interval composed of ten subframes. The minimum transmission unit in the frequency domain is a subcarrier, and the entire system transmission bandwidth is composed of $N_{BW}$ subcarriers 104.

In the time-frequency domain, a basic unit of resources is a resource element (RE) 112 and may be represented by an OFDM symbol index and a subcarrier index. A resource block (RB) 108 or a physical resource block (PRB) is defined as consecutive $N_{symb}$ OFDM symbols 102 in the time domain and consecutive $N_{RB}$ subcarriers 110 in the frequency domain. Therefore, one RB 108 is composed of REs 112 of $N_{symb}$ by $N_{RB}$. In general, the minimum transmission unit of data is the RB unit. In the LTE system, $N_{symb}$ is 7, $N_{RB}$ is 12, and $N_{BW}$ and $N_{RB}$ are proportional to the bandwidth of a system transmission band. A data rate increases in proportion to the number of RBs scheduled to the terminal. The LTE system defines and operates six transmission bandwidths. In case of an FDD system in which downlink and uplink are separated by frequency, a downlink transmission bandwidth and an uplink transmission bandwidth may be different from each other. A channel bandwidth represents an RF bandwidth corresponding to a system transmission bandwidth. Table 1 shows a relationship between a system transmission bandwidth and a channel bandwidth, defined in the LTE system. For example, an LTE system having a 10 MHz channel bandwidth has a transmission bandwidth formed of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information is transmitted within the first N OFDM symbols in the subframe. In general, N={1, 2, 3}. Therefore, the value of N is varied for each subframe according to the amount of control information to be transmitted in the current subframe. The control information includes a control channel transmission interval indicator indicating how many OFDM symbols are used for transmission of control information, scheduling information for downlink data or uplink data, an HARQ ACK/NACK signal, and the like.

In the LTE system, the scheduling information for downlink data or uplink data is transmitted from the base station to the terminal through downlink control information (DCI). The DCI defines various formats and is operated by applying a defined DCI format depending on whether the scheduling information is UL grant for uplink data or DL grant for downlink data, whether the control information is small-sized compact DCI, whether spatial multiplexing using multiple antennas is applied, or whether the DCI is for power control. For example, DCI format 1, which is scheduling control information (DL grant) for downlink data, is configured to include at least the following control information.

Resource allocation type 0/1 flag: This notifies whether a resource allocation type is type 0 or type 1. Type 0 is to allocate resources in units of resource block group (RBG) by applying bitmap method. In the LTE system, a basic unit of scheduling is an RB represented by time and frequency domain resources, and the RBG composed of a plurality of RBs becomes a basic unit of scheduling in type 0. Type 1 allocates a specific RB within the RBG.

Resource block assignment: This notifies an RB allocated to data transmission. The resources to be represented are determined according to the system bandwidth and the resource allocation type.

Modulation and coding scheme (MCS): This notifies the modulation scheme used for data transmission and the size of a transport block which is data to be transmitted.

HARQ process number: This notifies an HARQ process number.

New data indicator: This notifies whether HARQ transmission is initial transmission or retransmission.

Redundancy version: This notifies a redundancy version of HARQ.

Transmit power control (TPC) command for physical uplink control channel (PUCCH): This notifies a TPC command for PUCCH which is an uplink control channel.

After passing a channel coding and modulation process, the DCI is transmitted through a physical downlink control channel (PDCCH) (hereinafter, also referred to as control information) or an enhanced PDCCH (EPDCCH) (hereinafter, also referred to as enhanced control information).

Generally, the DCI is scrambled with a specific radio network temporary identifier (RNTI) (or a terminal identifier) independently for each terminal, and a cyclic redundancy check (CRC) is added and channel-coded. Then each DCI is configured as an independent PDCCH and transmitted. In the time domain, the PDCCH is mapped and transmitted during a control channel transmission interval. A frequency domain mapping position of the PDCCH is determined by an identifier (ID) of each terminal and spread over the entire system transmission band.

Downlink data is transmitted through a physical downlink shared channel (PDSCH) which is a physical channel for downlink data transmission. The PDSCH is transmitted after the control channel transmission interval. The scheduling information such as a specific mapping position in the frequency domain, a modulation scheme, and the like is informed by the DCI transmitted through the PDCCH.

Through the MCS formed of 5 bits among the control information configuring the DCI, the base station notifies, to the terminal, a modulation scheme applied to the PDSCH to be transmitted and a size of data (transport block size (TBS)) to be transmitted. The TBS corresponds to a size before channel coding for error correction is applied to data (transport block (TB)) to be transmitted by the base station.

The modulation schemes supported by the LTE system are quadrature phase shift keying (QPSK), 16 quadrature amplitude modulation (16QAM), and 64QAM, and the respective modulation orders correspond to 2, 4, and 6. That is, transmitted are 2 bits per symbol for QPSK modulation, 4 bits per symbol for 16QAM modulation, and 6 bits per symbol for 64QAM modulation.

Figure 2:
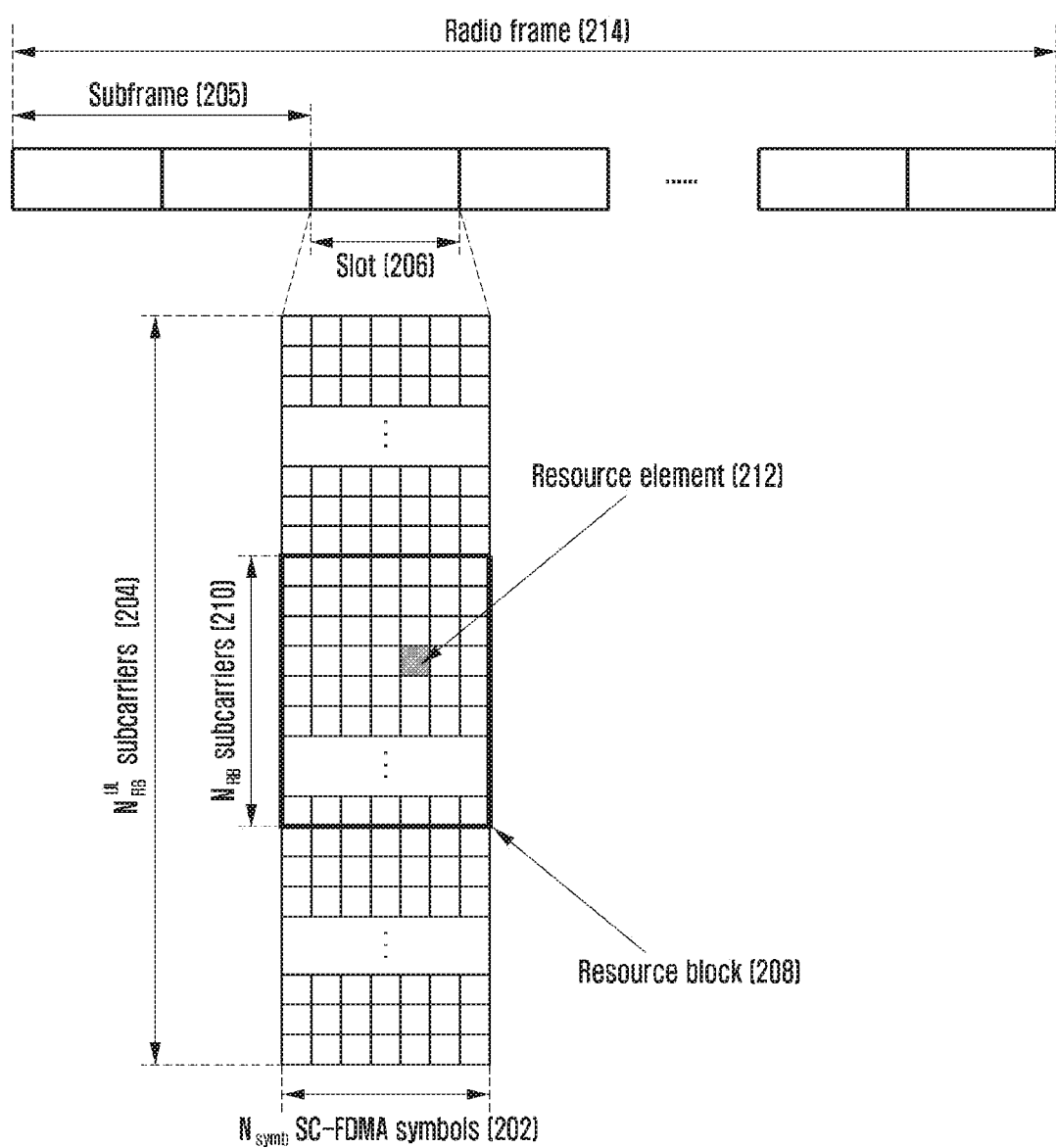
FIG. 2 is a diagram illustrating an uplink time-frequency domain transmission structure of a conventional LTE or LTE-A system.

FIG. 2 is a diagram illustrating a basic structure of a time-frequency domain which is a radio resource area for transmission of a data or control channel on uplink in the LTE system.

In FIG. 2, the horizontal axis represents the time domain, and the vertical axis represents the frequency domain. The minimum transmission unit in the time domain is an SC-FDMA symbol 202. $N_{symb}^{UL}$ SC-FDMA symbols constitute one slot 206, and two slots constitute one subframe 205. The minimum transmission unit in the frequency domain is a subcarrier, and the entire system transmission bandwidth 204 is composed of $N_{BW}$ subcarriers. The value of $N_{BW}$ is proportional to a system transmission band.

In the time-frequency domain, a basic unit of resources is a resource element (RE) 212 and may be defined by an SC-FDMA symbol index and a subcarrier index. A resource block (RB) pair 208 is defined as consecutive $N_{symb}^{UL}$ SC-FDMA symbols in the time domain and consecutive $N_{SC}^{RB}$ subcarriers in the frequency domain. Therefore, one RB is composed of REs of $N_{symb}^{UL}$ by $N_{SC}^{RB}$. In general, the minimum transmission unit of data or control information is the RB unit. PUCCH is mapped to the frequency domain corresponding to one RB and transmitted in one subframe.

In the LTE system, a timing relationship between a PDSCH, which is a physical channel for downlink data transmission, or a PDCCH/EPDDCH including a semi-persistent scheduling release (SPS release), and a PUCCH or PUSCH which is an uplink physical channel for transmission of corresponding HARQ ACK/NACK is defined. For example, in an LTE system that operates in a frequency division duplex (FDD), the HARQ ACK/NACK corresponding to the PDSCH or PDCCH/EPDCCH including SPS release transmitted in the n−4th subframe is transmitted as the PUCCH or PUSCH in the nth subframe.

In the LTE system, the downlink HARQ adopts an asynchronous HARQ scheme in which a data retransmission time point is not fixed. That is, when the base station receives the HARQ NACK from the terminal as feedback to the initial transmission data, the base station freely determines a transmission time point of retransmission data by a scheduling operation. The terminal decodes received data for HARQ operation, buffers data determined to be an error, and then performs combining with retransmission data.

Upon receiving the PDSCH including downlink data transmitted from the base station in the subframe n, the terminal transmits uplink control information including the HARQ ACK or NACK for the downlink data to the base station in the subframe n+k via the PUCCH or PUSCH. Here, k is defined differently according to FDD or time division duplex (TDD) of the LTE system and its subframe setting. For example, in case of the FDD LTE system, k is fixed to 4. On the other hand, in case of the TDD LTE system, k may be varied according to the subframe setting and the subframe number.

In the LTE system, contrary to the downlink HARQ, the uplink HARQ adopts a synchronous HARQ scheme in which the data transmission time point is fixed. That is, an uplink/downlink timing relationship among a physical uplink shared channel (PUSCH) which is a physical channel for uplink data transmission, a downlink control channel (PDCCH) which precedes the PUSCH, and a physical hybrid indicator channel (PHICH) which is a physical channel for transmission of downlink HARQ ACK/NACK corresponding to the PUSCH is fixed by the following rule.

Upon receiving the PDCCH including uplink scheduling control information or the PHICH for transmission of downlink HARQ ACK/NACK from the base station in the subframe n, the terminal transmits uplink data corresponding to the control information in the subframe n+k through the PUSCH. Here, k is defined differently according to FDD or time division duplex (TDD) of the LTE system and its setting. For example, in case of the FDD LTE system, k is fixed to 4. On the other hand, in case of the TDD LTE system, k may be varied according to the subframe setting and the subframe number.

When the terminal receives the PHICH carrying the downlink HARQ ACK/NACK from the base station in the subframe i, the PHICH corresponds to the PUSCH transmitted by the terminal in the subframe i-k. Here, k is defined differently depending on the FDD or TDD of the LTE system and its setting. For example, in case of the FDD LTE system, k is fixed to 4. On the other hand, in case of the TDD LTE system, k may be varied according to the subframe setting and the subframe number.

Figure 3:
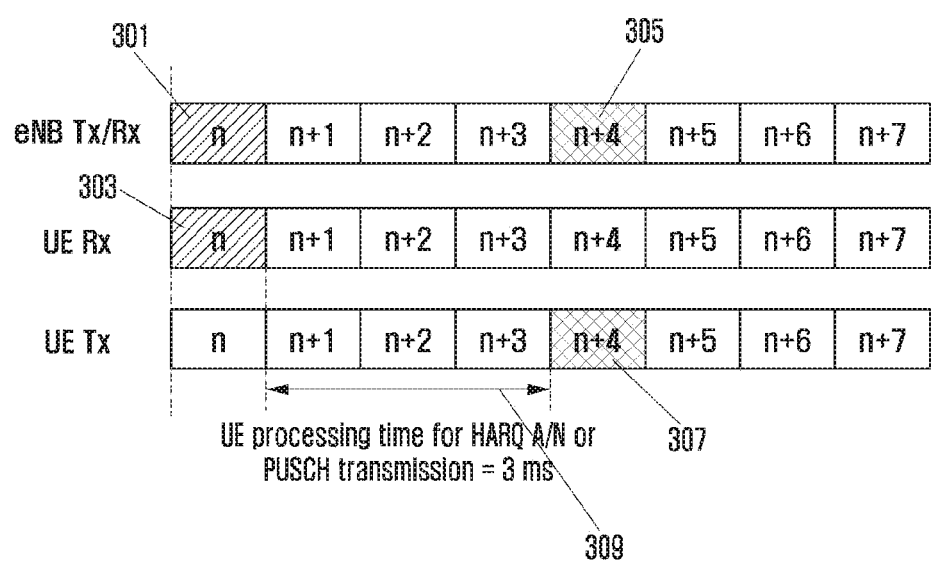
FIG. 3 is a diagram illustrating transmission/reception timing of first and second signals at a base station and a terminal when a propagation delay time is 0 in a conventional LTE or LTE-A system.

FIG. 3 is a diagram illustrating the timing of a base station and a terminal in an FDD LTE system when the terminal receives an uplink scheduling grant and then transmits uplink data or receives downlink data and then delivers HARQ ACK or NACK.

When the base station transmits an uplink scheduling grant or a downlink control signal and data to the terminal in the subframe n 301, the terminal receives the uplink scheduling grant or the downlink control signal and data in the subframe n 303.

First, in case of receiving the uplink scheduling grant in the subframe n, the terminal transmits uplink data in the subframe n+4 307.

Also, in case of receiving the downlink control signal and data in the subframe n, the terminal transmits an HARQ ACK or NACK for the downlink data in the subframe n+4 307.

Therefore, a processing time of the terminal for transmitting the uplink data after receiving the uplink scheduling grant or for delivering the HARQ ACK or NACK after receiving the downlink data is 3 ms corresponding to three subframes 309.

Meanwhile, since the terminal is generally separated from the base station, a signal transmitted by the terminal is received by the base station after a propagation delay. The propagation delay time may be regarded as a value obtained by dividing a path of a radio wave from the terminal to the base station by the speed of light. Normally, it may be regarded as a value obtained by dividing a distance between the terminal and the base station by the speed of light. For example, in case of the terminal located 100 km away from the base station, a signal transmitted by the terminal is received by the base station after about 0.34 msec. Conversely, a signal transmitted by the base station is also received by the terminal after about 0.34 msec.

As such, the time when the signal of the terminal arrives at the base station may vary depending on the distance between the terminal and the base station. Therefore, if the terminals located at different positions send signals at the same time, the arrival time at the base station may be different. In order to solve such a problem and to allow signals of the terminals to arrive at the base station at the same time, it is necessary to slightly vary the transmission time according to the position of each terminal. In the LTE system, this is referred to as a timing advance (or timing advance information).

In the LTE system, the terminal transmits a RACH signal or a random access preamble to the base station in order to perform a random access (RA). Then the base station calculates a timing advance value required for uplink synchronization of terminals and transmits the timing advance value of 11 bits to the terminal through a random access response.

Then, the terminal adjusts the uplink synchronization by using the received timing advance value. Thereafter, the base station continuously measures timing advance values additionally required for uplink synchronization of the terminal and transmits them to the terminal. Such an additional timing advance value is delivered in 6 bits via a MAC control element. The terminal adjusts the timing advance value by adding the received additional timing advance value of 6 bits to the already-applied timing advance value.

Figure 4:
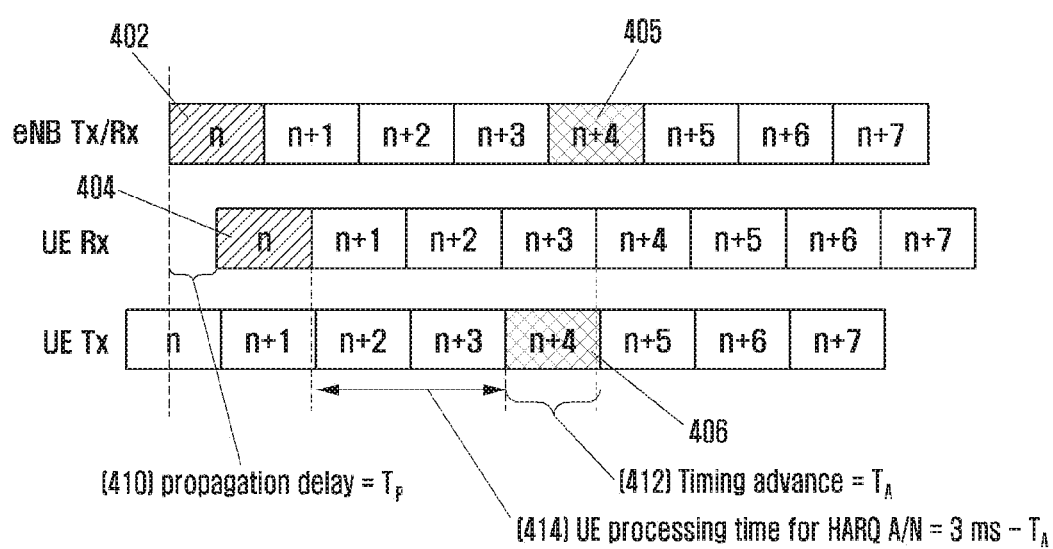
FIG. 4 is a diagram illustrating transmission/reception timing of first and second signals at a base station and a terminal when a propagation delay time is greater than 0 and when timing advance is applied in a conventional LTE or LTE-A system.

FIG. 4 is a diagram illustrating a timing relationship based on timing advance depending on a distance between a base station and a terminal in an FDD LTE system when the terminal receives an uplink scheduling grant and then transmits uplink data or receives downlink data and then delivers HARQ ACK or NACK.

When the base station transmits an uplink scheduling grant or a downlink control signal and data to the terminal in the subframe n 402, the terminal receives the uplink scheduling grant or the downlink control signal and data in the subframe n 404. At this time, the reception time of the terminal is later by a propagation delay time (TP) 410 than the transmission time of the base station.

First, in case of receiving the uplink scheduling grant in the subframe n, the terminal transmits uplink data in the subframe n+4 406.

Also, in case of receiving the downlink control signal and data in the subframe n, the terminal transmits an HARQ ACK or NACK for the downlink data in the subframe n+4 406.

In order for the base station to receive a signal of the terminal at a specific time, the terminal transmits the HARQ ACK/NACK for uplink or downlink data at the timing 406 which is earlier by TA 412 than the subframe n+4 based on the received signal. Therefore, a processing time of the terminal for transmitting the uplink data after receiving the uplink scheduling grant or for delivering the HARQ ACK or NACK after receiving the downlink data is a time 414 obtained by subtracting the TA from 3 ms corresponding to three subframes.

The 3 ms minus TA is the basis of the LTE system having a TTI of 1 ms. If the TTI length is shortened and the transmission timing is changed, the 3 ms minus TA may be changed to another value.

The base station calculates the absolute value of the TA of the corresponding terminal. The base station may calculate the absolute value of the TA by adding or subtracting, to or from a TA value initially delivered to the initially accessed terminal at the random access step, a TA value variation subsequently delivered via upper signaling.

In the present disclosure, the absolute value of the TA may be a value obtained by subtracting a start time of the nth TTI received by the terminal from a start time of the nth TTI transmitted by the terminal.

Meanwhile, one of important criteria of the cellular wireless communication system performance is the packet data latency. For this, in the LTE system, signal transmission and reception are performed in units of subframe having a transmission time interval (TTI) of 1 ms. In this case, the LTE system may support the terminal having a TTI shorter than 1 ms (i.e., short-TTI terminal or short-TTI UE). On the other hand, in the NR which is the 5G mobile communication system, the TTI may be shorter than 1 ms. The short-TTI terminal is expected to be suitable for a service, such as a voice over LTE (VoLTE) service and a remote control, in which latency is important. In addition, the short-TTI terminal is expected to be a means for realizing mission-critical Internet of things (IoT) on a cellular basis.

Figure 5:
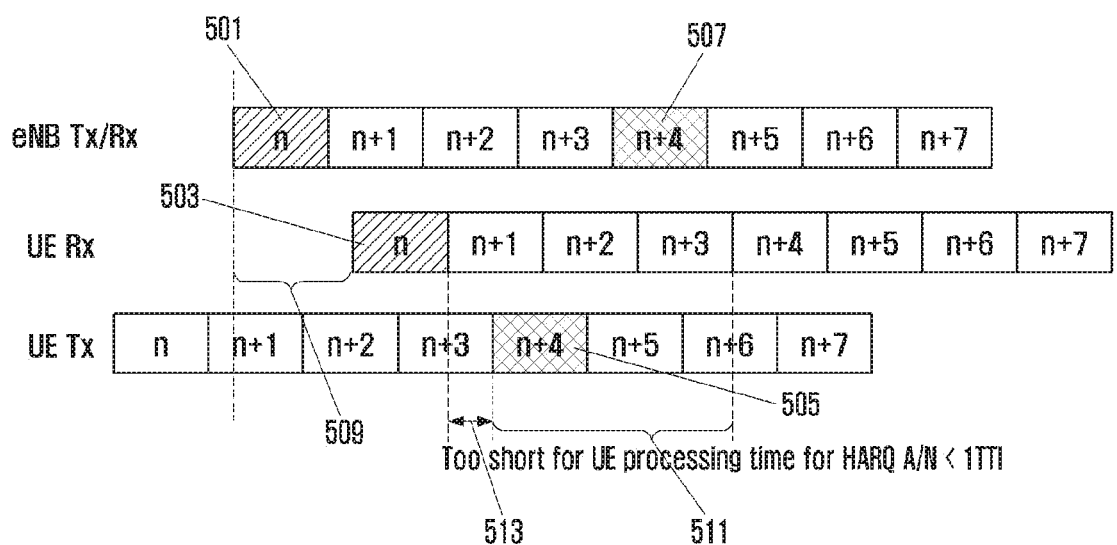
FIG. 5 is a diagram illustrating transmission/reception timing of first and second signals at a base station and a terminal when a propagation delay time is greater than 0 and when timing advance is applied in a conventional LTE or LTE-A system.

The 3 ms minus TA, which is a processing time of the terminal for signal transmission, as shown in FIG. 4 may be changed as shown in FIG. 5 for the short-TTI terminal or for the terminal having a large absolute value 511 of TA.

For example, when the uplink scheduling grant is transmitted in the nth TTI 501 and 503 and the corresponding uplink data is transmitted in the (n+4)th TTI 505 and 507, the three TTIs minus TA 513 may be a terminal processing time. If the TTI length is less than 1 ms and if the TA is large due to a long distance between the terminal and the base station, the terminal processing time, i.e., the three TTIs minus TA, may be small or even negative.

To solve this problem, the maximum value of the TA assumed for the short-TTI operation by the terminal may be separately set. The TA maximum value for the short-TTI operation is smaller than that of the LTE system, and may be a value arbitrarily assumed to determine the terminal support capability without being predetermined between the base station and the terminal. Therefore, the terminal that supports the short-TTI operation needs an operation method when a TA exceeding the TA maximum value for the short-TTI operation is allocated. Alternatively, a method for the terminal to deliver, to the base station, information about whether the short-TTI operation is possible is needed.

In the NR system, the types of supportable services may be classified into some categories such as enhanced mobile broadband (eMBB), massive machine type communications (mMTC), and ultra-reliable and low latency communications (URLLC).

The eMBB may be a service for high-speed transmission of high-capacity data, the mMTC may be a service for terminal power minimization and multiple-terminal access, and the URLLC may be a service for high reliability and low latency.

Different requirements may be applied depending on such service types applied to the terminal. For example, performing a given operation within a given processing time may be different according to the service types, and the URLLC in which low latency is important may have to perform a given operation within a short time. Therefore, depending on the service type given to the terminal, the restriction of the TA value required for the terminal may be varied. It may be stated that the terminal assumes different maximum TA values for respective services, or the terminal may assume the same TA maximum value even in case of different services.

Now, embodiments of the present disclosure will be described with reference to the accompanying drawings. In the following description, well known elements, functions, operations, techniques, etc. may not be described or illustrated in detail to avoid obscuring the subject matter of the present disclosure. In addition, the terms used herein are defined in consideration of their functions disclosed herein, and may be varied according to the intention of the user, the operator, or the like. Therefore, the definition should be based on this disclosure.

Hereinafter, the base station that is an entity of performing resource allocation of the terminal may be at least one of an eNode B, a Node B, a base station (BS), a radio access unit, a base station controller, or a node on a network.

The terminal may include user equipment (UE), a mobile station (MS), a cellular phone, a smart phone, a computer, or a multimedia system capable of performing a communication function.

In this disclosure, a downlink (DL) refers to a wireless transmission path of a signal transmitted to the terminal by the base station, and an uplink (UL) refers to a wireless transmission path of a signal transmitted to the base station by the terminal. Although the following embodiments will be described using the LTE or LTE-A system as an example, such embodiments may be applied to other communication systems having a similar technical background or channel form, such as the 5G (or new radio or NR) mobile communication system being developed after LTE-A. Also, embodiments of this disclosure may be applied to other communication systems through some modifications within the scope of the present disclosure without departing from the scope of the present disclosure as apparent to a person skilled in the art.

Unless specifically mentioned below, a shortened-TTI terminal may be also referred to as a first type terminal, and a normal-TTI terminal may be also referred to as a second type terminal. The first type terminal may include a terminal capable of transmitting control information and/or data in a TTI of 1 ms or less, and the second type terminal may include a terminal capable of transmitting control information and/or data in a TTI of 1 ms.

Hereinafter, the shortened-TTI terminal and the first type terminal will be used interchangeably, and the normal-TTI terminal and the second type terminal will be used interchangeably.

In addition, a shortened-TTI, a shorter-TTI, a shortened TTI, a shorter TTI, a short TTI, and sTTI have the same meaning and are used interchangeably.

In addition, a normal-TTI, a normal TTI, a subframe TTI, and a legacy TTI have the same meaning and are used interchangeably.

Hereinafter, a shortened-TTI transmission may be referred to as a first type transmission, and a normal-TTI transmission may be referred to as a second type transmission. The first type transmission is a transmission scheme of transmitting a control signal and/or a data signal in a TTI shorter than 1 ms, and the second type transmission is a transmission scheme of transmitting a control signal and/or a data signal in a TTI of 1 ms.

The shortened-TTI transmission and the first type transmission are used interchangeably, and the normal-TTI transmission and the second type transmission are used interchangeably.

The first type terminal may support both the first type transmission and the second type transmission, or may support only the first type transmission.

The second type terminal supports the second type transmission and does not perform the first type transmission.

For convenience, it may be interpreted that the first type terminal is for the first type transmission. If there are a normal-TTI and a longer-TTI instead of the shortened-TTI and the normal-TTI, the normal-TTI transmission may be referred to as the first type transmission and the longer-TTI transmission may be referred to as the second type transmission.

In this disclosure, the first type reception and the second type reception may be referred to as processes of receiving a first type transmission signal and a second type transmission signal, respectively.

The first type transmission may refer to a transmission scheme of performing uplink transmission after receiving uplink scheduling even through a TTI length is equal to that of conventional normal-TTI, or having faster HARQ ACK/NACK transmission timing according to downlink data transmission than that of conventional normal-TTI.

For example, in case of 1 ms TTI in the FDD LTE system, the HARQ ACK/NACK information for the PDSCH transmitted in the nth subframe is delivered in the (n+4)th subframe via the PUCCH or PUSCH, and this operation may be called a normal mode. However, in the first type transmission, even though the TTI of 1 ms is used equally, the HARQ ACK/NACK information for the PDSCH transmitted in the nth subframe may be delivered in the (n+2)th or (n+3)th subframe via the PUCCH or PUSCH, and this operation may be called a latency reduction mode. The latency reduction mode also includes a transmission/reception scheme based on the shortened-TTI. That is, the first type transmission may indicate at least one of a transmission scheme using the shortened TTI and a transmission scheme in which, even in case of the normal-TTI having a 1 ms TTI length, the HARQ ACK/NACK information for the PDSCH transmitted in the nth subframe is delivered in the (n+2)th or (n+3)th subframe via the PUCCH or PUSCH. The second type transmission may indicate a transmission scheme in which, in case of the normal-TTI having a 1 ms TTI length, the HARQ ACK/NACK information for the PDSCH transmitted in the nth subframe is delivered in the (n+4)th or subsequent subframe via the PUCCH or PUSCH.

In this disclosure, the TTI in the downlink refers to a unit of transmitting a control signal and a data signal, or may refer to a unit of transmitting a data signal. For example, in the existing LTE system, the TTI in the downlink is a subframe which is a time unit of 1 ms.

In this disclosure, the TTI in the uplink refers to a unit of transmitting a control signal or a data signal, or may refer to a unit of transmitting a data signal. In the existing LTE system, the TTI in the uplink is a subframe which is the same 1 ms time unit as in case of the downlink.

In this disclosure, the shortened-TTI mode is a case where the terminal or the base station transmits or receives a control signal or a data signal in the shortened TTI unit, and the normal-TTI mode is a case where the terminal or the base station transmits or receives a control signal or a data signal in the subframe unit.

In this disclosure, shortened-TTI data refers to data transmitted on the PDSCH or PUSCH transmitted/received in the shortened TTI unit, and normal-TTI data refers to data transmitted on the PDSCH or PUSCH transmitted/received in the subframe unit.

In this disclosure, a control signal for the shortened-TTI refers to a control signal for the operation of the shortened-TTI mode and is called sPDCCH. Also, a control signal for the normal-TTI refers to a control signal for the operation of the normal-TTI mode. For example, the control signal for the normal-TTI may be PCFICH, PHICH, PDCCH, EPDCCH, PUCCH, etc. in the existing LTE system.

In this disclosure, terms such as a physical channel and a signal in the LTE or LTE-A system may be used interchangeably as data or a control signal.

For example, the PDSCH which is a physical channel for transmission of the normal-TTI data may be referred to as the normal-TTI data. Also, the sPDSCH which is a physical channel for transmission of the shortened-TTI data may be referred to as the shortened-TTI data. Similarly, in this disclosure, the shortened-TTI data transmitted in the downlink and uplink may be referred to as sPDSCH and sPUSCH.

In this disclosure, transmission/reception operations of the shortened-TTI terminal and base station are defined as described above, and a detailed method for operating the existing terminal and the shortened-TTI terminal together in the same system is proposed.

In this disclosure, the normal-TTI terminal refers to a terminal that transmits or receives control information and data information in units of 1 ms or of one subframe. The control information for the normal-TTI terminal is transmitted on the PDCCH mapped to three OFDM symbols maximally in one subframe, or transmitted on the EPDCCH mapped to a specific resource block in one subframe. The shortened-TTI terminal may perform transmission/reception in units of subframe as in case of the normal-TTI terminal, or may perform transmission/reception in units smaller than the subframe. Alternatively, the shortened-TTI terminal may refer to a terminal that supports only transmission and reception in units smaller than the subframe.

In this disclosure, an uplink scheduling grant signal and a downlink data signal are referred to as a first signal. Also, an uplink data signal for the uplink scheduling grant signal and a HARQ ACK/NACK for the downlink data signal are referred to as a second signal. That is, among signals transmitted to the terminal by the base station, a signal that expects a response of the terminal may be the first signal, and a terminal's response signal corresponding to the first signal may be the second signal.

In this disclosure, the service type of the first signal may belong to a category such as enhanced mobile broadband (eMBB), massive machine type communications (mMTC), or ultra-reliable and low latency communications (URLLC).

In this disclosure, the TTI length of the first signal refers to the length of time during which the first signal is transmitted. Also, the TTI length of the second signal refers to the length of time during which the second signal is transmitted.

In this disclosure, the second signal transmission timing is information indicating when the terminal transmits the second signal and when the base station receives the second signal, and may be also referred to as second signal transmission/reception timing.

Figure 6:
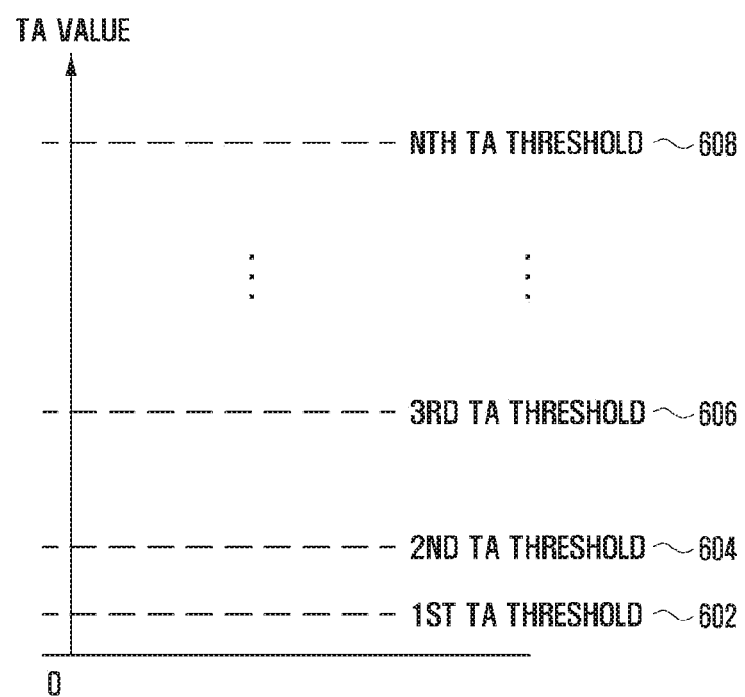
FIG. 6 is a diagram illustrating TA threshold values set to distinguish TA values of a terminal.

In this disclosure, as shown in FIG. 6 for example, specific TA values will be referred to as a first TA threshold 602, a second TA threshold 604, a third TA threshold 606, and a nth TA threshold 608. If n is 1, the first TA threshold becomes a unique specific TA value, which may be a value corresponding to about 0.67 ms defined as the TA maximum value in the LTE system.

Alternatively, only the first TA threshold and the second TA threshold may be defined. In this case, the second TA threshold corresponds to about 0.67 ms defined as the TA maximum value in the LTE system, and the first TA threshold may be any value smaller than about 0.67 ms. In this disclosure, it is assumed that the nth TA threshold becomes larger as n is larger. However, the sizes of the TA thresholds may be defined in ascending or descending order. Even though there is no order, this disclosure may be applied.

When there is no mention of the TDD system in this disclosure, the FDD system will be described in general. However, a method and apparatus in case of the FDD system as disclosed herein may be also applied to the TDD system through a simple modification.

In this disclosure, upper signaling refers to a method of transmitting a signal from the base station to the terminal through a downlink data channel of the physical layer or transmitting a signal from the terminal to the base station through an uplink data channel of the physical layer. The upper signaling may also be referred to as RRC signaling or a MAC control element (CE).

In this disclosure, the terminal may refer to the first type terminal unless otherwise mentioned. However, it will be clear whether the terminal is the first type terminal or the second type terminal according to the context.

Now, an operation method capable of reducing latency in transmission and reception between the terminal and the base station will be described through various embodiments.

First Embodiment

Figure 7:
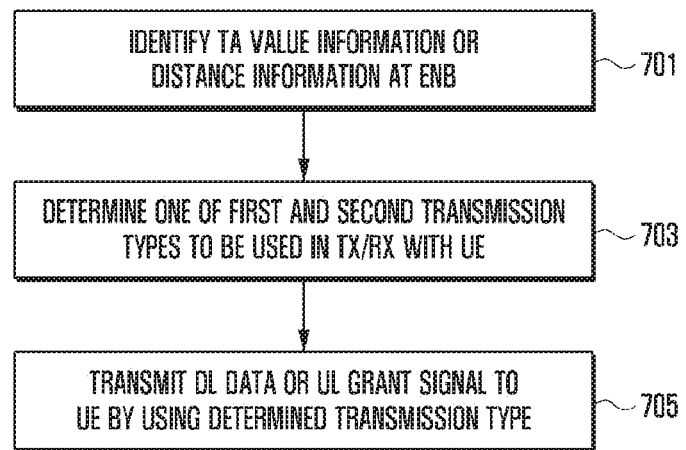
FIG. 7 is a diagram illustrating a procedure of a base station according to the first embodiment of the present disclosure.
Figure 8:
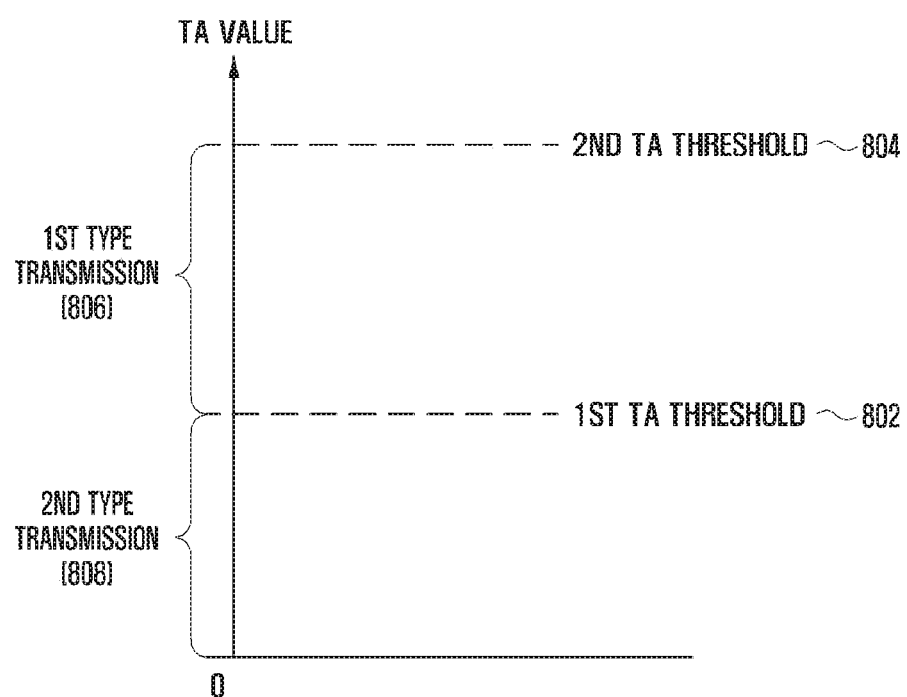
FIG. 8 is a diagram illustrating determination of transmission types based on TA threshold values and TA values according to the first embodiment of the present disclosure.

In the first embodiment, a method of calculating or finding an absolute value of a TA applied in a specific terminal by a base station, and using a TTI length suitable for data transmission/reception based on the absolute value will be described with reference to FIGS. 7 and 8.

That is, the first embodiment relates to a process of determining a transmission type for the terminal from among a first type and a second type when the base station knows the absolute value of the TA applied in a specific terminal.

When the terminal transmits a RACH signal (or a random access preamble) to the base station so as to perform a random access, the base station can find the TA absolute value of the terminal, and then transmit it to the terminal by inserting it in a random access response (RAR). The TA absolute value of the terminal determined by the base station may be different from an actual TA value which is a timing difference between the downlink and uplink in the corresponding terminal.

The base station stores the TA value of the terminal which is calculated from the RACH signal of the terminal and transmitted via the random access response. Then, at step 701, the base station updates the TA absolute value used by the terminal by adding or subtracting an additional TA value which is delivered to the terminal through the MAC control element and applied to the terminal.

In another embodiment, the base station may assign a PDCCH order to the terminal to enable the terminal to perform a contention-free RACH, and thereby find the TA absolute value which should be used by the terminal. At step 701, the PDCCH order may be a process in which the base station instructs the terminal to perform RACH by using a specific DCI format.

When scheduling a resource for downlink or uplink data transmission to the terminal, the base station may determine a transmission type from among the first and second transmission types by comparing the calculated TA absolute value with the first TA threshold, the second TA threshold, . . . , and the nth TA threshold at step 703. The first TA threshold, . . . , and the nth TA threshold may be arbitrarily set by the base station, or agreed between the base station and the terminal.

As mentioned above, in this disclosure, it is assumed that the nth TA threshold becomes larger as n is larger.

If the TA absolute value of the terminal calculated by the base station through the above process is smaller than the second TA threshold 804 and greater than the first TA threshold 802, the base station may determine that the terminal uses the second type transmission 806.

If the TA absolute value calculated by the base station is smaller than the first TA threshold 802, the base station may determine that the terminal uses the first type transmission 808.

Then, at step 705, the base station may transmit downlink data or an uplink grant signal to the terminal by using the transmission type determined through the above process.

Meanwhile, even if the terminal uses a TA value smaller than the first TA threshold, the second type transmission 808 may be performed instead of the first type transmission when there is another determination factor.

When a TA value greater than the first TA threshold 802 is applied in performing decoding, the terminal may assume that the first type transmission 808 is not performed from the base station. That is, the terminal may not attempt to detect a control signal for the first type transmission when applying a TA value greater than the first TA threshold 802. This embodiment may mean that the terminal attempts to detect only a control signal for the second type transmission in case of applying a TA value greater than the first TA threshold 802 in performing decoding. This embodiment may be modified to always detect both a control signal for the first type transmission and a control signal for the second type transmission regardless of the actually applied TA value.

In this embodiment, if the terminal sends, instead of the absolute value of the applied TA, distance information between the base station and the terminal, measured from positioning reference signal (PRS), etc., to the base station through an upper or physical layer signal, the base station may identify the distance information at step 701 and determine a transmission type suitable for data transmission/reception.

Second Embodiment

Figure 9:
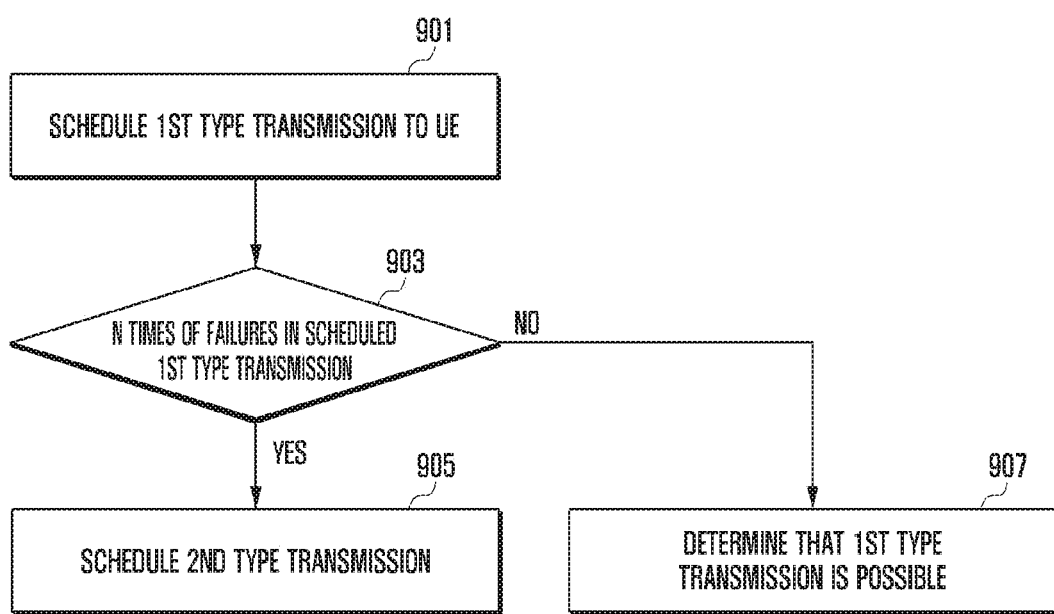
FIG. 9 is a diagram illustrating a procedure of a base station according to the second embodiment of the present disclosure.

In the second embodiment, a method for performing the second type transmission when the base station schedules the first type transmission to the terminal but a failure in transmission occurs will be described with reference to FIG. 9.

For example, the second embodiment relates to a process of determining a transmission type for the terminal from among the first type and the second type when the base station does not know the absolute value of the TA applied in a specific terminal.

In this disclosure, determining that a transmission failure occurs with respect to data transmitted by the base station or the terminal may be a case of DTX (e.g., when both ACK and NACK are not received) or a case where NACK is received.

The base station schedules the first type transmission for downlink or uplink to the terminal at step 901.

If the base station fails to detect a second signal which is a response signal of the terminal for a first signal corresponding to the scheduled first type transmission, the base station determines that the first type transmission scheduled to the terminal has failed. When N times of failures in the scheduled first type transmission occur at step 903, the base station determines that a current state of the terminal is impossible of the first type transmission, and schedules only the second type transmission at step 905.

Such impossibility of the first type transmission may be caused by a poor channel status to the terminal or by a failure in securing a sufficient processing time due to a long distance to the terminal when the terminal applies a TA value. The above-mentioned N times of failures in the scheduled first type transmission may be continuous or cumulatively. Also, the integer N may be a predetermined value or a value previously transmitted to the terminal through upper signaling. Further, the determination about the impossibility of the first type transmission may be maintained until a predetermined time elapses, and the base station may try again the first type transmission after the predetermined time. For example, even if scheduling the downlink as the first type transmission for downlink data transmission, the base station may fail to receive HARQ ACK/NACK feedback for the downlink data from the terminal at the predetermined timing. If such failures occur repeatedly N times, the base station may transmit the downlink data through the second type transmission.

On the other hand, if the base station detects the second signal which is a response signal of the terminal for the first signal corresponding to the first type transmission, the base station may determine at step 907 that the first type transmission is possible.

Third Embodiment

Figure 10:
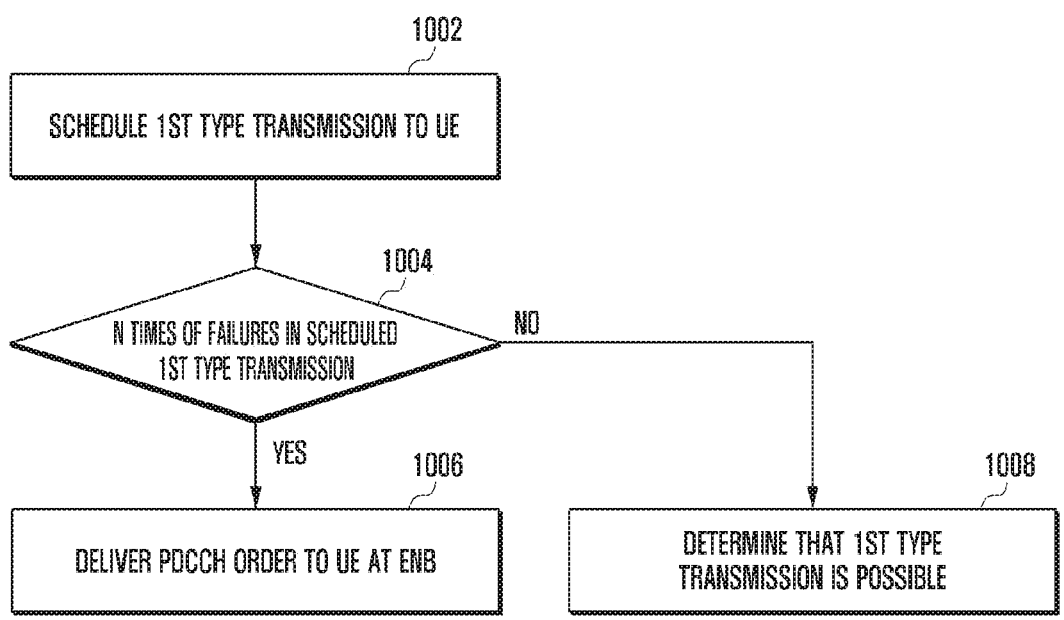
FIG. 10 is a diagram illustrating a procedure of a base station according to the third embodiment of the present disclosure.

In the third embodiment, a method for giving a PDCCH order to the terminal when the base station schedules the first type transmission to the terminal but a failure in transmission occurs will be described with reference to FIG. 10.

In order to find a TA value to be applied by the terminal, the base station may derive the PRACH transmission of the terminal through the PDCCH order.

The base station schedules the first type transmission for downlink or uplink to the terminal at step 1002.

If the base station fails to detect a second signal which is a response signal of the terminal for a first signal corresponding to the scheduled first type transmission, the base station determines that the first type transmission scheduled to the terminal has failed.

When N times of failures in the scheduled first type transmission occur at step 1004, the base station transmits the PDCCH order, which is a command to perform PRACH, to the terminal at step 1006. The PDCCH order may be a command for the terminal to transmit a PRACH signal in a determined time-frequency resource through a physical layer signal or upper signaling.

The above-mentioned N times of failures in the scheduled first type transmission may be continuous or cumulatively. Also, the integer N may be a predetermined value or a value previously transmitted to the terminal through upper signaling.

Further, the determination about the impossibility of the first type transmission may be maintained until a predetermined time elapses. After the predetermined time, the base station may try again the first type transmission or deliver again the PDCCH order.

The base station receives a random access preamble from the terminal in response to the PDCCH order, and thus may calculate the TA absolute value for the terminal. Then, based on the calculated TA absolute value, the base station may determine the transmission type for the terminal.

On the other hand, if the base station receives the second signal which is a response signal of the terminal for the first signal corresponding to the scheduled first type transmission, the base station may determine at step 1008 that the first type transmission is possible.

Fourth Embodiment

Figure 11:
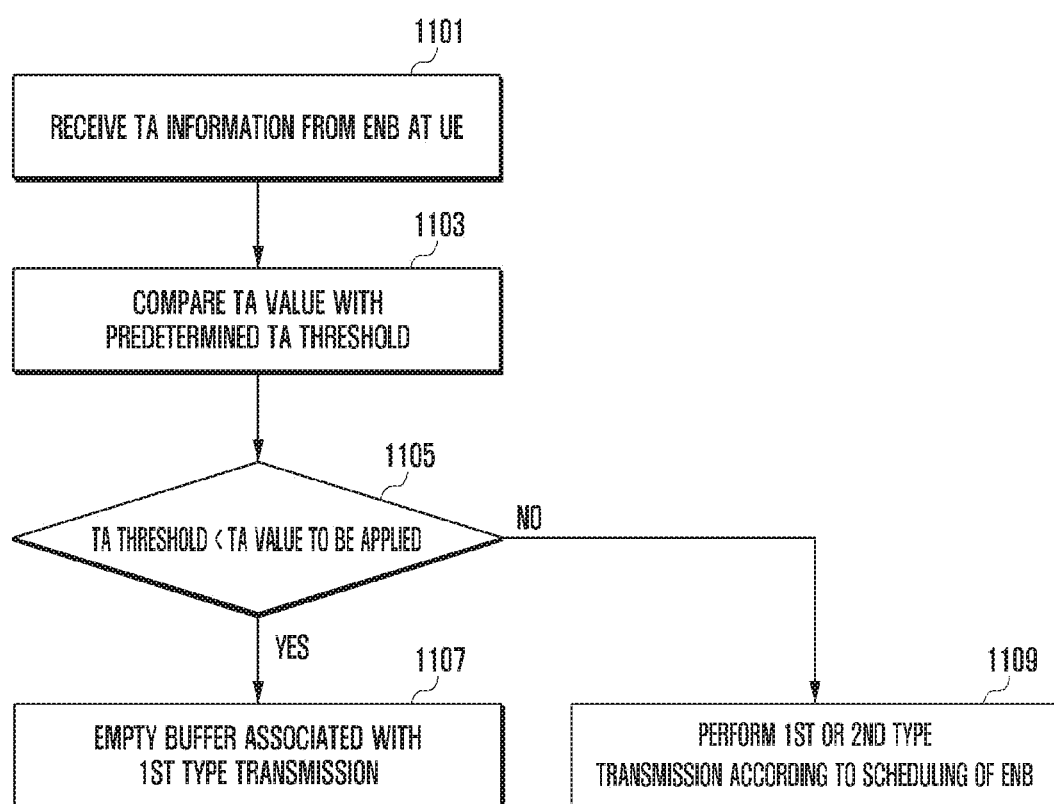
FIG. 11 is a diagram illustrating a procedure of a terminal according to the fourth embodiment of the present disclosure.

In the fourth embodiment, a method for emptying data from all buffers associated with the first type transmission when the terminal exceeds a predetermined TA threshold will be described with reference to FIG. 11.

When the terminal transmits a RACH signal to the base station so as to perform a random access, the base station transmits a random access response (RAR) including the TA absolute value of the terminal to the terminal. The TA absolute value of the terminal determined by the base station may be different from an actual TA value which is a timing difference between downlink and uplink in the corresponding terminal.

The base station stores the TA value of the terminal which is calculated from the RACH signal of the terminal. Then, the base station updates the TA absolute value used by the terminal by adding or subtracting an additional TA value which is delivered at step 1101 to the terminal through the MAC control element and applied to the terminal.

The terminal finds TA information at step 1101 by updating the TA value applied by the terminal with the TA absolute value or additional TA value received from the base station, compares the TA value with a specific TA threshold at step 1103, and determines at step 1105 whether the found TA information is greater than the specific TA threshold.

If the found TA information of the terminal is greater than the specific TA threshold, the terminal performs an operation of emptying data from all buffers or soft buffers associated with the first type transmission at step 1107.

If the found TA information of the terminal is smaller than the specific TA threshold, the terminal performs the first or second type transmission according to the base station scheduling at step 1109.

The specific TA threshold may be one of the first TA threshold, the second TA threshold, . . . , the nth TA threshold. The specific TA threshold may be determined according to the TTI length applied to the first type transmission or according to the transmission type or offered to the terminal via upper signaling.

The operation of emptying data from the buffer or soft buffer may be to delete the stored data, or may be to store new data to be received in the existing buffer so that the existing data is lost.

After performing the emptying operation, the terminal may further perform the PRACH. From the PRACH step, the base station may find the TA value of the terminal.

Fifth Embodiment

Figure 12:
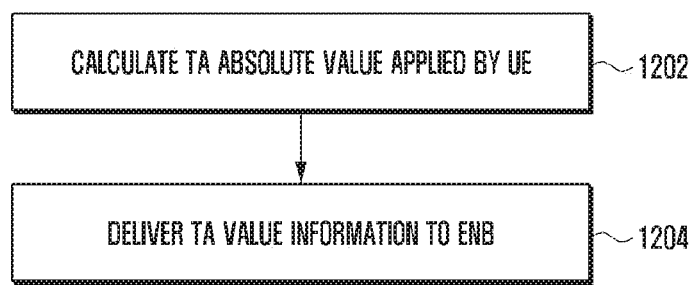
FIG. 12 is a diagram illustrating a procedure of a terminal according to the fifth embodiment of the present disclosure.

In the fifth embodiment, a method for the terminal to deliver information of a TA value, used by the terminal, to the base station will be described with reference to FIG. 12.

The reason that the terminal delivers the TA value information of the terminal to the base station is that the base station may not know the TA value information used by the terminal. However, the terminal does not necessarily transmit the TA value information to the base station only when the base station does not know the TA value information of the terminal.

When the terminal transmits a RACH signal to the base station so as to perform a random access, the base station transmits a random access response (RAR) including the TA absolute value of the terminal to the terminal. The TA absolute value of the terminal determined by the base station may be different from an actual TA value which is a timing difference between downlink and uplink in the corresponding terminal.

The base station stores the TA value of the terminal which is calculated from the RACH signal of the terminal. Then, the base station updates the TA absolute value used by the terminal by adding or subtracting an additional TA value which is delivered to the terminal through the MAC control element and applied to the terminal.

When the terminal calculates and updates at step 1202 the TA value applied by the terminal with the TA absolute value or additional TA value received from the base station, the terminal may transmit information of a newly applied TA value to the base station at step 1204.

This delivery of TA value information is performed through the physical layer signal or the upper signaling.

For delivery of the TA value from the terminal to the base station, the base station may allocate resources in advance to the terminal, or the terminal may perform a scheduling request for transmission.

The TA value that the terminal desires to deliver to the base station may be the absolute value of the TA applied by the terminal or may be bits indicating a specific TA interval. For example, the terminal may send information about whether the TA value is smaller than the first TA threshold, smaller than the second TA threshold, or smaller than the nth TA threshold.

Sixth Embodiment

In the sixth embodiment, a method for allowing the base station to separately allocate a scheduling request (SR) resource or for allowing bits of the SR to indicate different transmission types so that the terminal can distinguish the transmission types in uplink transmission will be described with reference to FIGS. 13A and 13B.

Figure 13:
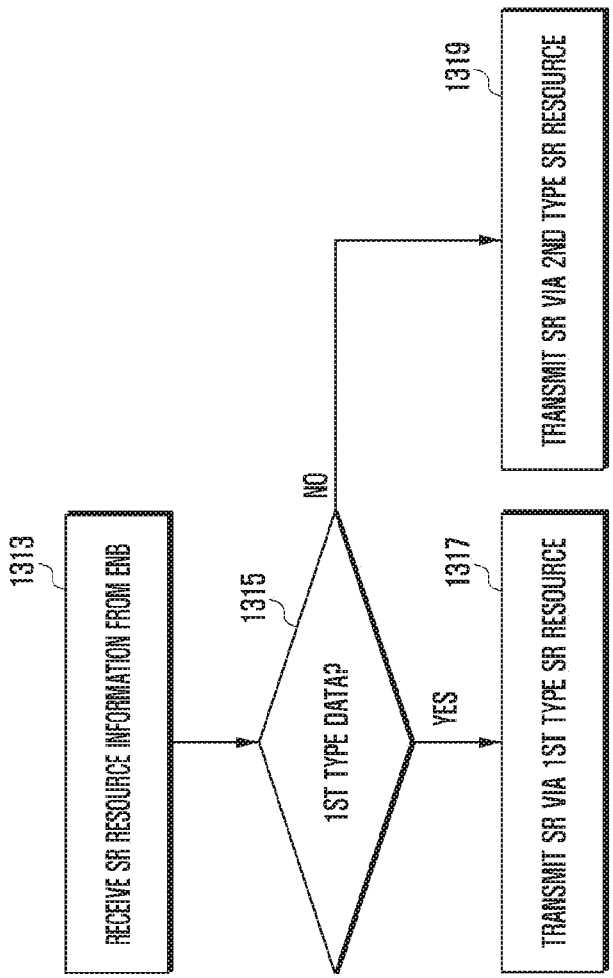
FIG. 13 is a diagram illustrating procedures of a base station and a terminal according to the sixth embodiment of the present disclosure.

First, FIG. 13A shows an operation sequence of the base station according to the sixth embodiment of the present disclosure.

When allocating SR resources available for transmission of the terminal, the base station may allocate a separate SR resource according to transmission types at step 1301. The base station may transmit information of the allocated SR resource to the terminal through upper signaling or a physical layer signal at step 1303.

A corresponding operation of the terminal is shown in FIG. 13B.

The terminal may receive and identify at step 1313 the SR resource for each transmission type allocated by the base station.

Then, the terminal may identify at step 1315 a transmission type to be used for transmission, select an SR resource according to the transmission type, and transmit the SR to the base station through the selected SR resource. For example, in case of desiring to perform the first type transmission, the terminal may transmit the SR using the SR resource for the first type at step 1317.

On the other hand, in case of desiring to perform the second type transmission, the terminal may transmit the SR using the SR resource for the second type at step 1319.

Meanwhile, when the terminal selects its transmission type, the terminal may refer to necessary data requirements received from an upper layer. These requirements may include QoS, the maximum value of a required delay time, and the like. Therefore, when the maximum value of the required delay time of data is small, the first type transmission may be needed for transmission with a small delay time.

Alternatively, when delivering the SR to the base station, the terminal may transmit information about the transmission type by using one or more bits.

Seventh Embodiment

Figure 14:
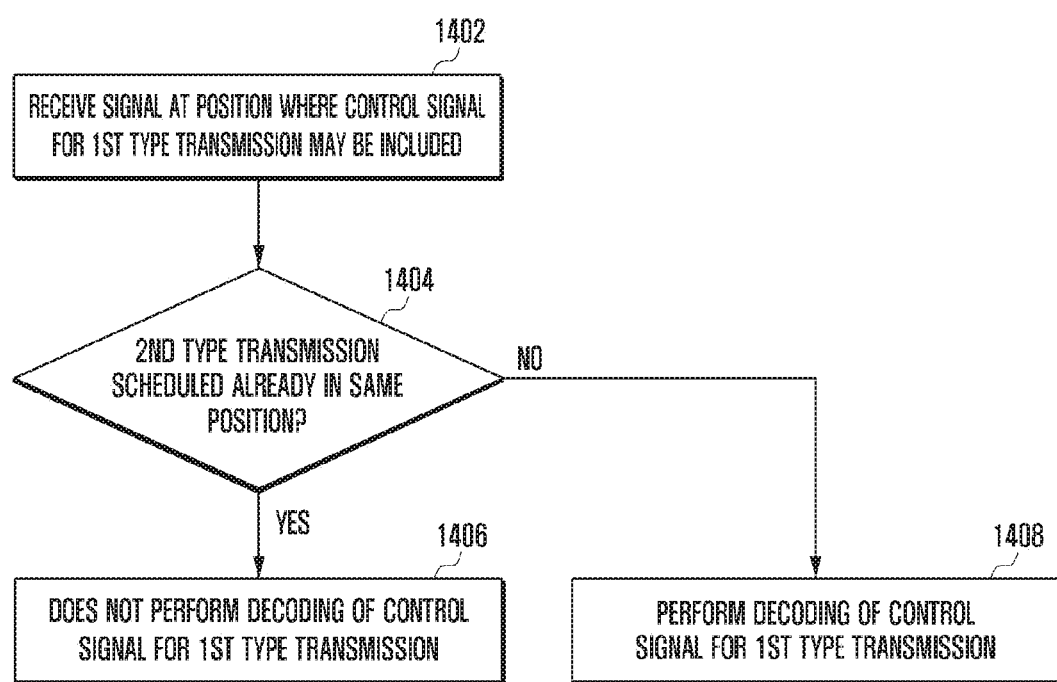
FIG. 14 is a diagram illustrating a procedure of a terminal according to the seventh embodiment of the present disclosure.

In the seventh embodiment, a method for the terminal to decode a control signal for the first type transmission will be described with reference to FIG. 14.

When the terminal receives at step 1402 a signal at a frequency or time position where a control signal for the first type transmission may be included, the terminal checks at step 1404 whether the second type transmission has already been scheduled in a corresponding frequency and time interval.

The terminal that receives the scheduling of the second type transmission in each subframe or given interval may not perform the detection of a control signal corresponding to the first type transmission at step 1406. For example, the terminal that receives the scheduling of the second type transmission in each subframe or given interval may attempt to detect only a control signal corresponding to the second type transmission.

Receiving the scheduling of the second type transmission may mean that the control signal for the second type signal is detected, the transmission of the second type signal is set through the upper signaling, or the scheduling is performed for a predetermined time by semi-persistent scheduling.

Detecting the first type transmission may mean an operation of detecting the control signal for the first type signal or blind-decoding the shortened PDCCH (sPDCCH).

If the scheduling of the second type transmission is not received at step 1404, the terminal may perform at step 1408 decoding of the control signal for the first type transmission at a position where the control signal for the first type transmission may exist.

The terminal having received the scheduling of the second type transmission may assume that the first type transmission is not performed in an interval where the scheduling of the second type transmission is available. The interval where the scheduling of the second type transmission is available may be a subframe unit, a predetermined interval, or an interval defined as a start point and an end point through a specific physical layer signal.

In the seventh embodiment described with reference to FIG. 14, only a case where the terminal having received the scheduling of the second type transmission in each subframe or given interval does not perform the detection of the control signal corresponding to the first type transmission, this is not construed as a limitation. In a modification of the seventh embodiment, the terminal having received the scheduling of the first type transmission in each subframe or given interval does not perform the detection of the control signal corresponding to the second type transmission.

In addition, although it is described that the terminal having received the scheduling of the second type transmission in each subframe or given interval may not perform at step 1406 the detection of the control signal corresponding to the first type transmission, in a modified embodiment specific terminals may always perform the detection of the control signal corresponding to the first type transmission regardless of whether or not the second type transmission is scheduled.

Eighth Embodiment

Figure 15:
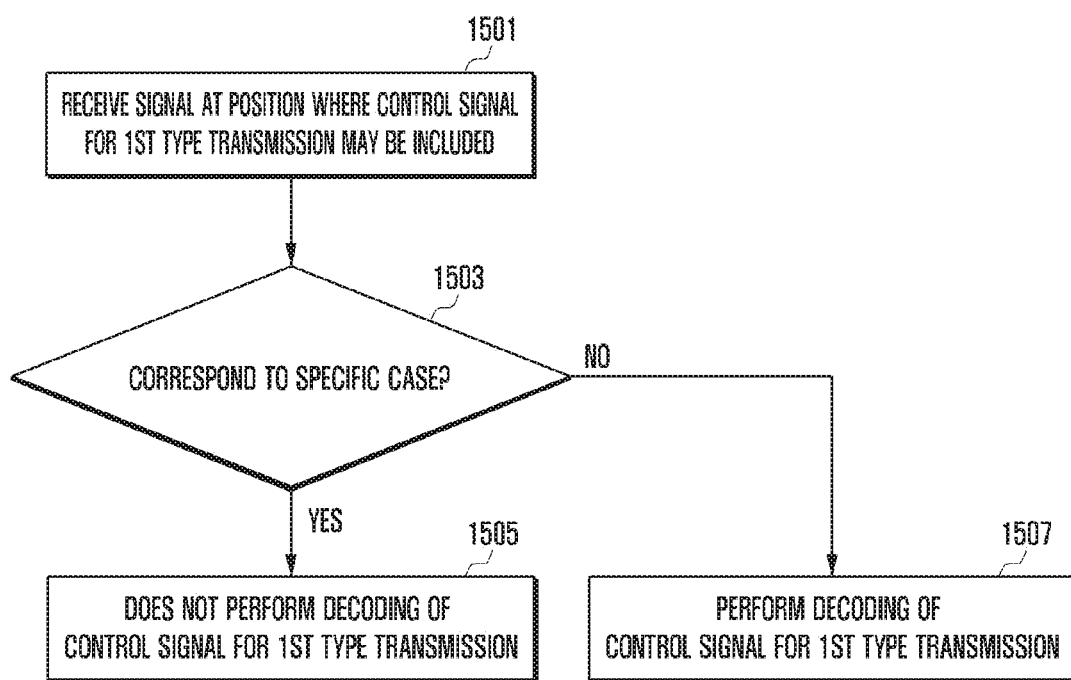
FIG. 15 is a diagram illustrating a procedure of a terminal according to the eighth embodiment of the present disclosure.

In the eighth embodiment, a method for the terminal to decode a control signal for the first type transmission will be described with reference to FIG. 15.

When the terminal receives at step 1501 a signal at a frequency or time position where a control signal for the first type transmission may be included, the terminal checks at step 1503 whether the second type transmission has already been scheduled in a corresponding frequency and time interval. The terminal that receives the scheduling of the second type transmission in each subframe or given interval does not perform the detection of a control signal corresponding to the first type transmission in a specific case according to information of the control signal corresponding to the second type transmission. This may mean that the terminal having received the scheduling of the second type transmission in each subframe or given interval detects only the control signal corresponding to the second type transmission in a specific case.

The above specific case may correspond to a case where the TBS indicated by information of a control signal corresponding to the second type transmission is greater than a predetermined size, a case where the MCS level is equal to or greater than a predetermined value, or a case where the number of allocated PRBs is equal to or greater than a predetermined value.

Therefore, the terminal checks at step 1503 whether the received control signal for the second type transmission corresponds to the specific case, and if so, the terminal does not perform decoding of the control signal for the first type transmission at step 1505. That is, in a specific case, the terminal may decode only the control signal for the second type transmission in a corresponding interval.

Conversely, if the control signal for the second type transmission does not correspond to the specific case, the terminal performs decoding of the control signal for the first type transmission at step 1507. Receiving the scheduling of the second type transmission may mean that the control signal for the second type signal is detected, the transmission of the second type signal is set through the upper signaling, or the scheduling is performed for a predetermined time by semi-persistent scheduling. Detecting the first type transmission may mean an operation of detecting the control signal for the first type signal or blind-decoding the shortened PDCCH (sPDCCH).

The terminal having received the scheduling of the second type transmission may assume that the first type transmission is not performed in an interval where the scheduling of the second type transmission is available. The interval where the scheduling of the second type transmission is available may be a subframe unit, a predetermined interval, or an interval defined as a start point and an end point through a specific physical layer signal.

Figure 16:
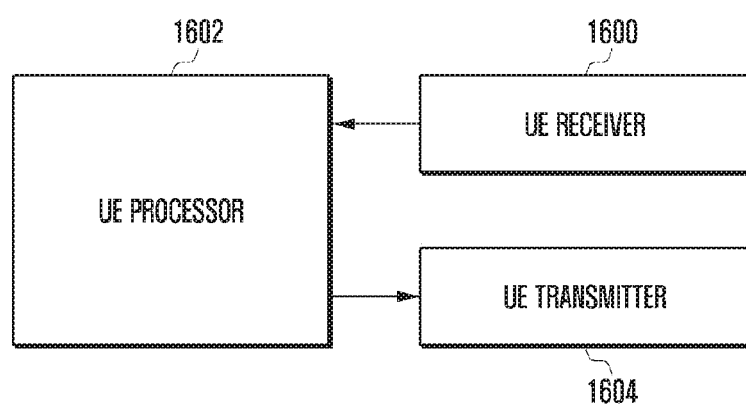
FIG. 16 is a block diagram illustrating an internal structure of a terminal according to embodiments of the present disclosure.
Figure 17:
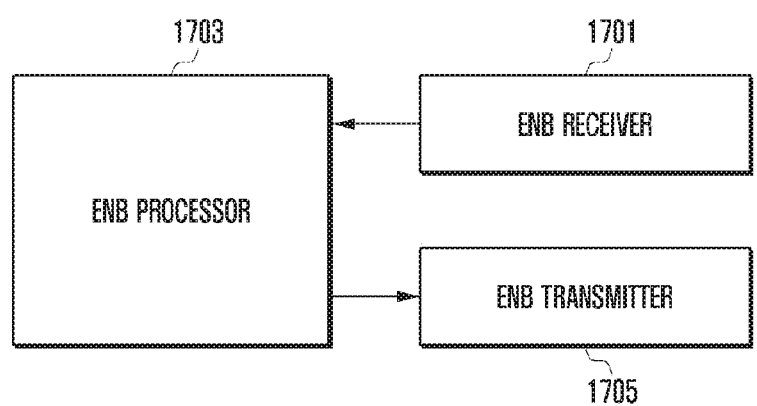
FIG. 17 is a block diagram illustrating an internal structure of a base station according to embodiments of the present disclosure.

The terminal and the base station each having a transmitter, a receiver, and a processor for implementing the above-described embodiments of the present disclosure are shown in FIGS. 16 and 17, respectively.

The above-described first to sixth embodiments show transmission/reception methods of the base station and terminal for determining the timing of transmitting/receiving a second signal and performing a related operation. The receiver, the processor, and the transmitter in each of the base station and the terminal should operate in accordance with such embodiments.

FIG. 16 is a block diagram illustrating an internal structure of a terminal according to embodiments of the present disclosure.

As shown in FIG. 16, the terminal of the present disclosure may include a terminal receiver 1600, a terminal transmitter 1604, and a terminal processor 1602 (also referred to as a controller).

In embodiments of the present disclosure, the terminal receiver 1600 and the terminal transmitter 1604 may be collectively referred to as a transceiver.

The transceiver may transmit and receive signals to and from the base station. These signals may include control information and data. For this, the transceiver may include an RF transmitter for up-converting and amplifying the frequency of a signal to be transmitted, an RF receiver for low-noise amplifying a received signal and down-converting the frequency, and the like. In addition, the transceiver may receive a signal through a radio channel, output the received signal to the terminal processor 1602, and transmit a signal, output from the terminal processor 1602, through a radio channel.

The terminal processor 1602 may control the terminal to operate in accordance with the above-described embodiments of the present disclosure. For example, the terminal receiver 1600 may receive a signal including the second signal transmission timing information from the base station, and the terminal processor 1602 may control to interpret the second signal transmission timing. Then, the terminal transmitter 1604 transmits the second signal at the above timing.

FIG. 17 is a block diagram illustrating an internal structure of a base station according to embodiments of the present disclosure.

As shown in FIG. 17, the base station of the present disclosure may include a base station receiver 1701, a base station transmitter 1705, and a base station processor 1703 (also referred to as a controller).

In embodiments of the present disclosure, the base station receiver 1701 and the base station transmitter 1705 may be collectively referred to as a transceiver.

The transceiver may transmit and receive signals to and from the terminal. These signals may include control information and data. For this, the transceiver may include an RF transmitter for up-converting and amplifying the frequency of a signal to be transmitted, an RF receiver for low-noise amplifying a received signal and down-converting the frequency, and the like. In addition, the transceiver may receive a signal through a radio channel, output the received signal to the base station processor 1703, and transmit a signal, output from the base station processor 1703, through a radio channel.

The base station processor 1703 may control the base station to operate in accordance with the above-described embodiments of the present disclosure. For example, the base station processor 1703 may determine the second signal transmission timing and control to generate the second signal transmission timing information to be delivered to the terminal. Then, the base station transmitter 1705 delivers the timing information to the terminal, and the base station receiver 1701 receives the second signal at the above timing.

In addition, according to an embodiment of the present disclosure, the base station processor 1703 may control to generate downlink control information (DCI) including the second signal transmission timing information. In this case, the DCI may indicate the second signal transmission timing information.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure. Further, the disclosed embodiments may be implemented in combination as needed. For example, the first, second, and fifth embodiments of the present disclosure may be combined, at least in part, with each other for the operations of the base station and terminal. Also, although the above embodiments are presented on the basis of the FDD LTE system, such embodiments or modifications thereof based on the same technical idea may be implemented in other systems such as the TDD LTE system, the 5G or NR system, and the like.

As described above, in the present disclosure, the uplink scheduling grant signal and the downlink data signal have been referred to as the first signal, and also the uplink data signal for the uplink scheduling grant and the HARQ ACK/NACK for the downlink data signal have been referred to as the second signal. However, such types of the first and second signals are only illustrative examples of the present disclosure in order to facilitate understanding of the present disclosure and are not intended to limit the scope of the present disclosure. That is, it will be apparent to those skilled in the art that other types of the first and second signals based on the technical idea of the present disclosure can be implemented.

The invention claimed is:

1. A method performed by a base station in a wireless communication system, the method comprising:
   transmitting, to a terminal, a radio resource control (RRC) message including at least one of a first scheduling request (SR) resource configuration for a first transmission type or a second SR resource configuration for a second transmission type, wherein the first transmission type is associated with a first transmission time interval (TTI) and the second transmission type is associated with a second TTI; and
   receiving, from the terminal, the SR on an SR resource, the SR resource being identified based on the first SR resource configuration for the first transmission type or the second SR resource configuration for the second transmission type included in the RRC message,
   wherein a length of the first TTI is smaller than a length of the second TTI.

2. The method of claim 1, further comprising:
   transmitting, to the terminal, a message for configuring the terminal with the first transmission type, the message including information for the first TTI,
   wherein the SR resource corresponds to the first TTI.

3. The method of claim 1, wherein the transmission type of the terminal is determined based on at least one of a quality of service (QoS) or a required delay time of uplink data associated with the SR.

4. A method performed by a terminal in a wireless communication system, the method comprising:
   receiving, from a base station, a radio resource control (RRC) message including at least one of a first scheduling request (SR) resource configuration for a first transmission type or a second SR resource configuration for a second transmission type, wherein the first transmission type is associated with a first transmission time interval (TTI) and the second transmission type is associated with a second TTI;
   determining a transmission type of the terminal, based on uplink data to be transmitted to the base station;
   identifying an SR resource based on the first SR resource configuration for the first transmission type or the second SR resource configuration for the second transmission type included in the RRC message; and
   transmitting, to the base station, the SR on the identified SR resource,
   wherein a length of the first TTI is smaller than a length of the second TTI.

5. The method of claim 4, further comprising:
   receiving, from the base station, a message for configuring the terminal with the first transmission type, the message including information for the first TTI,
   wherein the identified SR resource corresponds to the first TTI.

6. The method of claim 4, wherein the transmission type is determined based on at least one of a quality of service (QoS) or a required delay time of the uplink data.

7. A base station in a wireless communication system, the base station comprising:
   a transceiver; and
   a controller configured to:
      control the transceiver to transmit, to a terminal, a radio resource control (RRC) message including at least one of a first scheduling request (SR) resource configuration for a first transmission type or a second SR resource configuration for a second transmission type, wherein the first transmission type is associated with a first transmission time interval (TTI) and the second transmission type is associated with a second TTI, and control the transceiver to receive, from the terminal, the SR on an SR resource, the SR resource being identified based on the first SR resource configuration for the first transmission type or the second SR resource configuration for the second transmission type included in the RRC message.

8. The base station of claim 7, wherein the controller is further configured to control the transceiver to transmit, to the terminal, a message for configuring the terminal with the first transmission type, the message including information for the first TTI, and wherein the SR resource corresponds to the first TTI.

9. The base station of claim 8, wherein the transmission type of the terminal is determined based on at least one of a quality of service (QoS) or a required delay time of uplink data associated with the SR.

10. A terminal in a wireless communication system, the terminal comprising:

a transceiver; and a controller configured to:

control the transceiver to receive, from a base station, a radio resource control (RRC) message including at least one of a first scheduling request (SR) resource configuration for a first transmission type or a second SR resource configuration for a second transmission type, wherein the first transmission type is associated with a first transmission time interval (TTI) and the second transmission type is associated with a second TTI, determine a transmission type of the terminal, based on uplink data to be transmitted to the base station, identify an SR resource based on the first SR resource configuration for the first transmission type or the second SR resource configuration for the second transmission type included in the RRC message, and control the transceiver to transmit, to the base station, the SR on the identified SR resource, wherein a length of the first TTI is smaller than a length of the second TTI.

11. The terminal of claim 10, wherein the controller is further configured to receive, from the base station, a message for configuring the terminal with the first transmission type, the message including information for the first TTI, and wherein the identified SR resource corresponds to the first TTI.

12. The terminal of claim 10, wherein the controller is further configured to determine the transmission type based on at least one of a quality of service (QoS) or a required delay time of the uplink data.

* * * * *